June 25, 1946.  R. C. DU PONT  2,402,879
APPARATUS FOR PICKING-UP ARTICLES BY AIRCRAFT IN FLIGHT
Filed Oct. 25, 1941  2 Sheets-Sheet 1
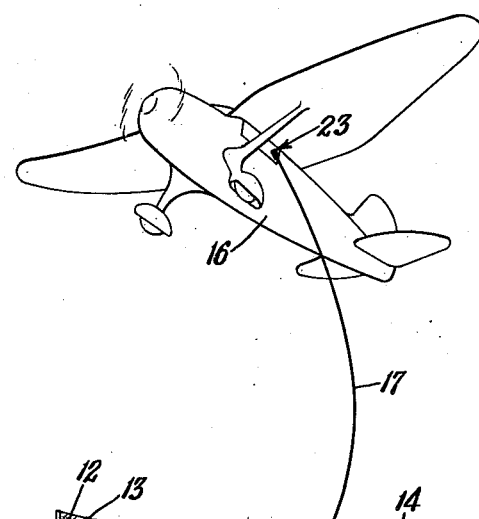
Fig. 1.
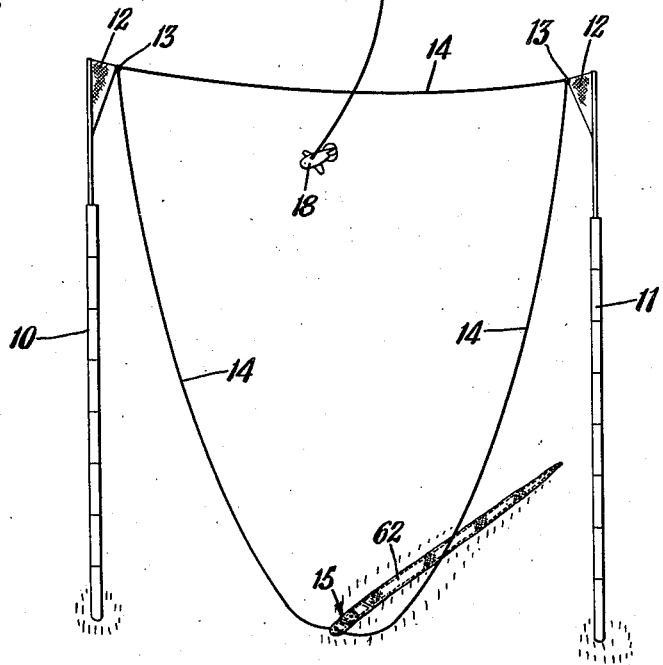
Fig. 2.
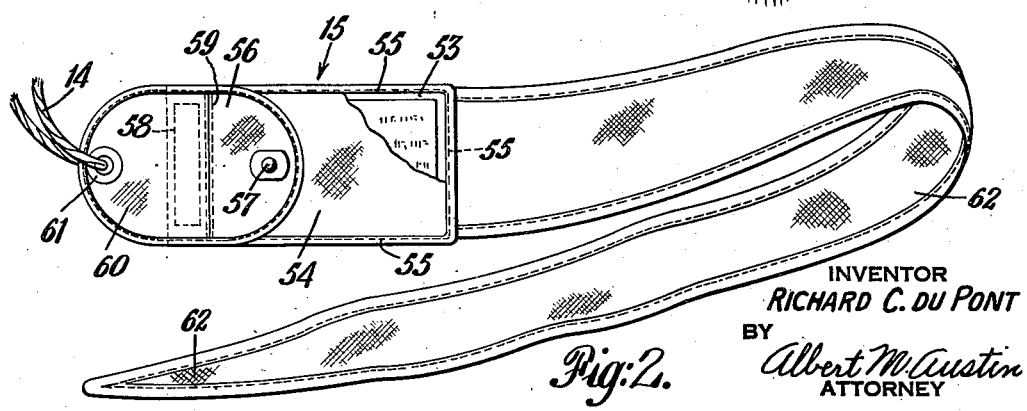
INVENTOR
RICHARD C. DU PONT
BY
Albert M. Austin
ATTORNEY

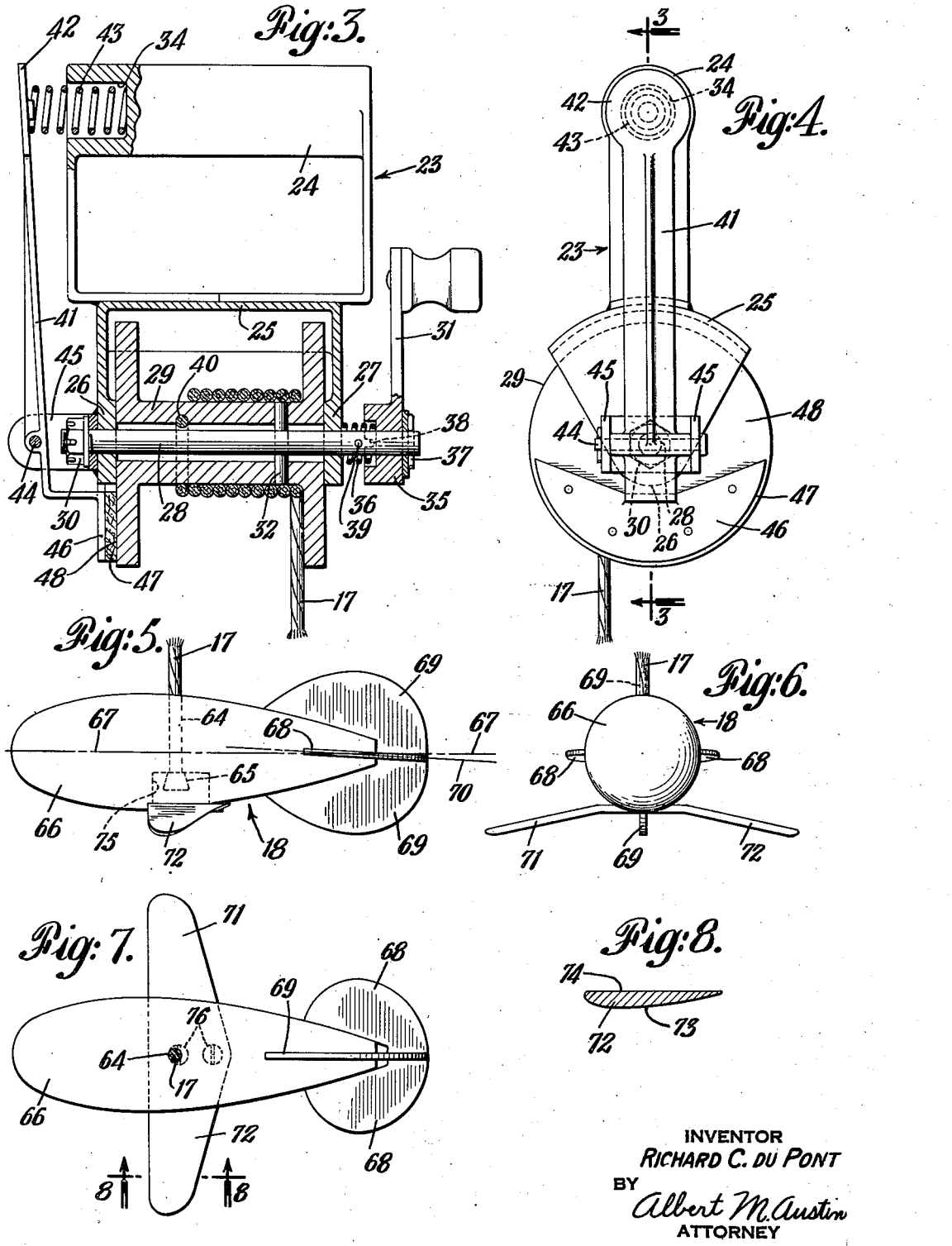

Patented June 25, 1946

2,402,879

UNITED STATES PATENT OFFICE 2,402,879

APPARATUS FOR PICKING UP ARTICLES BY AIRCRAFT IN FLIGHT

Richard C. du Pont, Granogue, Del., assignor to All American Aviation, Inc., Wilmington, Del., a corporation of Delaware Application October 25, 1941, Serial No. 416,450

5 Claims. (Cl. 258—1.2)

This invention relates to an improvement in apparatus for making pick-ups from aircraft in flight, and more particularly to devices commonly known as "fish."

In military as well as in some civilian operations, it is desirable to communicate between the ground and the aircraft and for this purpose to pass a written message from the ground to the aircraft. Various means have been used to accomplish this end, but the one which has, up to the present, proven most satisfactory is to place the message in a small container attached to a ground loop or light rope which in turn is suspended between two poles set upright in the ground. Where the loads to be picked up were small, such as single paper messages, a person in an aircraft then trailed a line over the side of the aircraft with a weight attached to the end of this line. This weight was generally known as a "fish." The aircraft was then flown so as to bring the training line into contact with the ground loop suspended on the poles.

The line suspended between the poles was attached by any suitable means which would readily release upon application of contact of the trailing line with the suspended line. The suspended line would thus be transferred to the trailing line and held against displacement by the interlocking effect of the two lines at the juncture with the weight or fish.

The shape of the fish was varied, some of them being nothing but a plain ball and others were elongated, and with the speeds of the older aircraft the force of gravity was sufficient to hold the weight well below the aircraft without necessitating paying out a great amount of line. Even while operating at the slower speeds of the older aircraft, these fish were not highly useful because any sudden movement of the airplane occasioned by the pilot, or by encountering gusty air, would be transmitted through the line to the weight and the weight would frequently surge upward or backward or oscillate so that it became increasingly difficult to control the position of the weight at the time that the aircraft passed over the ground loop.

As the speed of aircraft has increased with modern developments, the attendant resistance of the fish due to the motion through the air has increased to a point where it has been necessary to use more and more line with a result that the fish was trailing at a great distance behind the aircraft and still only slightly below it. As more line is paid out, the fish is more and more apt to oscillate or gyrate with the doubly bad result that it not only makes picking up the loop more difficult but it also endangers the aircraft and its occupants.

According to the present invention these difficulties are overcome by providing a fish comprising an air foil having its reduced pressure surface, generally called lifting surface, on its underside so as to cause the air passing thereover to exert a downward force upon the fish, and providing the fish with sufficient weight, compared to its aerodynamic surface, to exert controlling influence on the fish when the air foil is precluded from performing its intended function by external influence such as when carrying the load.

According to a preferred form of the invention the fish comprises a substantially solid torpedo-like body made of cast iron or lead or some other heavy material, having at its lower side a wing the upper surface of which is substantially parallel to the axis of the body and whose lower surface is cambered to constitute a negative "lifting" surface, that is, a surface which, when acted upon by the aero-dynamic force of the air, exerts a downward force on the fish, assisting gravity. In addition, the wings slope outwardly and downwardly away from the body, forming a "negative dihedral" or "positive inverted dihedral" for lateral stabilization. In addition, the stern of the body is provided with a vertical stabilizing fin, and with a horizontal stabilizing fin set at a slight angle of incidence, tending to cause the body to dip downwardly as it is towed through the air by the aircraft.

For controlling the fish according to the present invention, a special hand reel is provided having a handle adapted to be held by an operator in the aircraft and having a suitable crank for winding up the pick-up cord and a brake for controlling the paying out of the pick-up cord.

In addition, according to the present invention a flat, pocket-like container is provided for holding a message having a suitable flap for closing the pocket and a tail attached to the rear end of the pocket. The forward end of the pocket is provided with an ear having a grommet to which the transfer rope is attached and is provided with a weight which, together with the tail, limits or prevents the rocketing or gyrating of the pocket after it is picked up by the fish and is trailing behind the aircraft.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 illustrates diagrammatically an aircraft with a fish, according to the invention, suspended therefrom, approaching a ground station preparatory to picking up a load.

Fig. 2 illustrates one form of light load in the form of a cloth packet for holding a message.

Fig. 3 is a side elevation, largely in section, of one form of reel for paying out and taking up the fish line, taken on the line 3—3 of Fig. 4.

Fig. 4 is an end elevation of the reel.

Fig. 5 is a side elevation of the fish.

Fig. 6 is a front elevation of the fish.

Fig. 7 is a top plan view of the fish, and

Fig. 8 is a section through the wing on the line 8—8 of Fig. 7.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, there is illustrated a complete system and equipment for practising the invention. Referring to Fig. 1, the aircraft which is to pick up the message is indicated by 16 and the line trailing from the aircraft by 17 and the fish by 18. The dangling line 17 is illustrated in a position just prior to its engagement with the transfer loop or ground rope 14. The ground rope 14, which is a closed loop, is suspended between two poles 10 and 11 set in the ground. These poles have sturdy lower sections and weak upper sections supporting flags 12. Flags 12 are connected to the transfer loop 14 by releasable couplings 13. The container in which the message is contained is denoted by 15. This rests on the ground and is tied to the loop 14. The reel illustrated in Figs. 3 and 4 will be held by an operator inside the plane 16, from which the line 17 is unwound.

Briefly, in operation, when the operator of the plane 16 approaches the ground station to pick up the message contained in pocket 15, he pays out the cord 17, permitting the fish 18 to dangle under the plane a sufficient distance to engage the transfer loop 14. The engagement of the line 17 with the upper ply of loop 14 causes the releasable couplings 13 to release, and the interlocking engagement with the fish 18 carries the transfer loop 14 and pocket 15 along with the plane. The trailing cord 17 is then wound up, and the transfer loop 14 and package 15 are drawn into the plane.

Referring now to Figs. 3 and 4, one form of reel is shown for paying out and winding up the pickup cord 17. This reel, indicated by 23, comprises a handle 24 to which is secured a strap 25 having bearing arms 26 and 27. Journaled in arms 26 and 27 is a shaft 28 supporting a drum 29 and secured thereto by pin 32. A nut 30 is threaded on the end of shaft 28 and fixed thereto by a cotter pin as shown. On the other end of shaft 28 is a crank 31, having a hub 35 loosely mounted on the shaft and held in position by a washer and cotter pin 37. A spring 36 engages bearing arm 27 and a recess in hub 35. Hub 35 has slots 38 adapted to engage a pin 39 passed through shaft 28. Thus it will be seen that, with the crank 31 in the position shown, the drum 29 is free to rotate independently thereof, the spring 36 holding the slots 38 out of engagement with pin 39. When it is desired to wind the reel, the crank 31 is pushed axially, overcoming spring 36 and engaging pin 39 and slots 38, after which the crank 31 is rotated to rotate the drum 29, the brake of course being released as explained below.

Wound on the drum 29 is the cord 17, the end thereof passing through a hole 40 in the drum and suitably knotted or otherwise fixed in position. For controlling the paying out of this cord, means are provided for applying braking effort to the drum 29. This comprises a brake lever 41, having a thumbpiece 42 normally held away from handle 24 by spring 43 seated in the recess 34. Lever 41 is mounted on pivot 44, which is supported by ears 45 secured to bearing arm 26. The lever 41 supports an arcuate brake shoe 46, to which is secured a brake lining 47 engaging the outer surface 48 of reel 29 which constitutes a braking surface. In the position shown in Figs. 3 and 4, the brake is engaged, and when it is desired to release the brake the thumb engages thumbpiece 42 against spring 43, the fingers of the operator's hand being engaged around the cylindrical handle 24.

Referring now to Fig. 2, the pouch or pocket 15 is of light canvas construction adapted to hold light messages comprising, for example, a few sheets of paper. The pouch comprises a back wall 53 to which is stitched a front wall 54, stitching being indicated by 55 on the sides and bottom or trailing edge of the pocket. The fourth side is closed by a flap 56 stitched to the back wall 53 at 59 and has detachable engagement with the front wall 54 by a detachable fastener 57. By opening fastener 57 and lifting flap 56, access is given to the open end of the pocket formed by walls 53 and 54.

Secured to the back wall 53 and preferably integral therewith, is a flap or ear 60 having a grommet 61 through which passes the ground loop 14. Flap 60 is provided with a flat weight 58 suitably stitched in position. Secured to the trailing edge of the pocket is a tail or flag 62. The purpose of the weight 58 and long tail 62 is to prevent rocketing and gyrating as the pocket 15 is pulled through the air after being picked up by the fish 18.

Referring now to Figs. 5 to 8, the fish 18 comprises a substantially solid body 66 of heavy material, such as iron or lead, suitably streamlined and substantially symmetrical about a longitudinal axis 67. The body 66 is provided at its stern with lateral fins or elevators 68 set at an angle of incidence of a few degrees in such manner as to cause the body 66 to tend to move downwardly as it is propelled through the air by the rope 17. The plane of elevator 68 is indicated by 70. The stem of the body 66 is also provided with a vertical fin 69 for stability in a horizontal plane.

To assist gravity and to cause an aerodynamic force to be applied to the fish, wings 71 and 72 are provided. These wings are formed from a single strip of metal and have a substantially plane top surface 74 and cambered lower surface 73. These wings are secured to the body by screws 76 and close a recess 75, which houses a knot or other abutment 65 on the end of cord 17, this cord passing through an opening 64 and being located near the center of gravity of the fish, being slightly aft thereof.

As shown particularly in Fig. 6, the wings 71 and 72 are given an inverted dihedral for a lateral stabilization. It will be noted that the upper surface of wings 71 and 72 is located in a plane substantialy parallel to the axis of the body 66 and the lower surface 73 is curved to provide the "negative lift" or downward pull due to the aerodynamic action of the air on its surface as the fish is being propelled through the air (see also Fig. 8).

In operation, as the operator in plane 16 pays out the rope 17 with the fish 18 secured thereto, a downward force will be exerted on the fish due, first, to its weight; second, to the downward thrust due to the aerodynamic action on its wings; and, third, to the angle of incidence of its elevators 68. These three forces will be resisted by the force exerted by the rope 17 and the action of the fish will depend upon the relative values of these several forces and, particularly, the relative positions of the center of gravity, the point at which the cord 17 is applied, and the center of action of the wings 71 and 72. Due to the action of these forces, the fish will take a position more nearly under the plane and will not stream a long way behind the plane as did prior devices of this kind. The fish will thus be in a position where it can be easily observed by the operator of the plane and its position more accurately gauged with respect to the transfer loop 14 for the picking-up operation.

The several wings and fins provide both lateral and vertical stabilization and prevent rocketing and hunting with its resulting dangers to the plane and the persons in it while the fish is in normal towing relationship to the aircraft.

As the line 17 engages the upper ply of transfer loop 14, it slides along on this upper ply until the ply engages the fish, after which the transfer loop becomes interlocked behind the wings 71 and 72, and the transfer rope is then carried along with the fish 18 and its rope 17. This engagement upsets and ruins the normal aerodynamic action of the fish, but due to the weight thereof and due to the drag caused by the loop 14 and by the tail 62 on the pocket 15 rocketing and zooming is effectively prevented.

As an example of the relative dimensions in sizes of the various parts, but without being limited thereto, the poles 10 and 11 may be about 20 feet high and set about 20 feet apart. The line 17 may be about 35 feet long when fully paid out and the fish may weigh in the order of a few pounds and be about five inches long.

Thus a pick-up system, particularly for messages and other light loads, is provided which is efficient and reliable in operation. It has been found that it is possible to provide a fish which will fly at a point almost directly beneath the point from which it is suspended from the aircraft and any sudden movement of the airplane caused by intentional turning or change in flight altitude or by unintentional turning or change in flight altitude, due to gusty air or turbulence, will have a minimum effect on the fish, and that it will continue to travel at the desired point below the aircraft. The take-up device being portable can be used in any aircraft, and the message pouch will interpose a minimum of shock when picked up and will trail safely behind the fish and aircraft.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a device to be trailed from an aircraft for picking up an object on the ground, a fish comprising a substantially solid tear-drop body, said body having a vertical stabilizing fin and a horizontal stabilizing fin at the stern thereof, said body having at its lower surface a wing projecting from either side, said wings projecting outwardly and downwardly from the body to form an inverted dihedral, the upper surface of the wings being disposed in planes substantially parallel to the axis of the body, the lower surface of the wings being cambered, a towing rope attached to said body from the upper side thereof and near the center of gravity, said wings and said horizontal fin having such angles of incidence as to cause the aerodynamic forces to assist gravity as the fish is towed by the aircraft.

2. In a light weight air pick-up system a ground station comprising two poles, a loop releasably supported by said poles, a container attached to said loop, a fish for engaging the supporting loop, said fish weighing not more than a few pounds, and having two horizontal wings extending downwardly from the body of said fish, said wings having an inverted air foil cross section providing a low pressure area near their under surface, a line attached to said fish near the center of gravity of the fish and a hand-held reel for winding said line in and out.

3. A fish for a light load aerial pick-up system comprising a streamlined body of tear-drop configuration, a vertical stabilizing fin, a horizontal stabilizing fin attached to said body, means for attaching a line to said body near its center of gravity, and a pair of wings attached to the body extending outwardly and downwardly to form an inverted dihedral, the upper surface of said wings being substantially plane, the lower surface being cambered, said wings and said horizontal fin having such angles as to cause aerodynamic forces to assist gravity and provide vertical and lateral stability.

4. A fish constructed as described in claim 3 weighing not more than a few pounds having stable trailing characteristics while in free flight and having a substantially solid body with a specific gravity of at least that of iron, said fish continuing in stable flight after its aerodynamic characteristics have been destroyed by engagement with a ground loop.

5. In an aerial pick-up system, an aircraft, a pick-up line suspended from said aircraft, a fish carried by said line having a body with wings in a position in flight to provide air foils having low pressure surfaces placed downwardly away from said aircraft to assist gravity on said body, said body having insufficient weight alone to maintain it in stable flight while being trailed through the air before pick-up, a loop for engagement with said body, a load attached to said loop, said wings being attached to said body in such position that upon engagement with said loop said body is moved from said position destroying said air foil characteristic, whereby the load picked up thereafter acts to maintain stable flight.

RICHARD C. DU PONT.